United States Patent
Ryu

(10) Patent No.: US 8,122,839 B2
(45) Date of Patent: Feb. 28, 2012

(54) METHOD FOR MANUFACTURING NATURAL FIBER STRIPE-QUILTED FABRIC HAVING PROTRUDED WRINKLE PATTERNS ON ITS SURFACE

(75) Inventor: Kwang Yeol Ryu, Daegu (KR)

(73) Assignee: Dong Jin Bedding Co., Ltd., Daegu (KR)

( * ) Notice: Subject to any disclaimer, the term of this patent is extended or adjusted under 35 U.S.C. 154(b) by 0 days.

(21) Appl. No.: 12/844,353

(22) Filed: Jul. 27, 2010

(65) Prior Publication Data

US 2012/0000406 A1 Jan. 5, 2012

(30) Foreign Application Priority Data

Jul. 5, 2010 (KR) ........................ 10-2010-0064439

(51) Int. Cl.
*D05B 11/00* (2006.01)
(52) U.S. Cl. ...................................................... 112/117
(58) Field of Classification Search .................. 112/117, 112/118, 119, 1, 427, 440, 441, 475.08; 5/482, 5/500, 502
See application file for complete search history.

(56) References Cited

U.S. PATENT DOCUMENTS

| | | | | |
|---|---|---|---|---|
| 3,270,696 A | * | 9/1966 | Lowenstein | 112/475.22 |
| 3,898,943 A | * | 8/1975 | Braden et al. | 112/475.08 |
| 4,384,381 A | * | 5/1983 | Lowthian | 5/496 |
| 4,395,964 A | * | 8/1983 | Warren | 112/475.08 |
| 5,272,995 A | * | 12/1993 | Harger | 112/475.08 |
| 7,318,384 B2 | * | 1/2008 | Gray | 112/117 |

* cited by examiner

*Primary Examiner* — Tejash Patel
(74) *Attorney, Agent, or Firm* — Lowe Hauptman Ham & Berner, LLP

(57) ABSTRACT

The method for manufacturing a natural fiber stripe-quilted fabric having protruded wrinkle patterns on its surface is disclosed, in which a quilting machine is installed by fixing a sewing machine support member in a diagonal direction at 70~85° with respect to a running direction of a quilted fabric on an upper plate 50a, and a motor-driven sewing machine is installed in a support structure at a constant interval, and a sewing machine needle 52a is downwardly disposed at an interval of 3~4 cm, and a sewing guide plate 52b is installed along with a certain space between a lower side of the support member 51 and an upper plate of a quilting machine for allowing a quilting fabric A to pass through, and a guide hole 52c is formed so that a sewing machine needle can pass from an upper side to a lower side, and a under thread supply apparatus 52d is installed in a lower side.

13 Claims, 7 Drawing Sheets

METHOD FOR MANUFACTURING NATURAL FIBER STRIPE-QUILTED FABRIC HAVING PROTRUDED WRINKLE PATTERNS ON ITS SURFACE

TECHNICAL FIELD

The present invention relates to a method for manufacturing a natural fiber stripe-quilted fabric having protruded wrinkle patterns on its surface, and in particular to a method for manufacturing natural fiber stripe-quilted fabric having protruded wrinkle patterns on its surface in which in a method for manufacturing a natural fiber stripe-quilted fabric having protruded wrinkle patterns on its surface by sequentially performing the steps of preparing a surface sheet and a back sheet by using a cotton fabric sheet made of a 30S~60S cotton fiber, preparing a cotton plate made by needle-punching raw cotton in a size of 2~5 mm thick and a weight of 190~210 g/m², manufacturing a stripe-quilted fabric by sewing with a sewing interval of 5~10 mm by disposing a cotton plate between cotton fiber sheets and inputting the same into a quilting machine, treating a stripe-quilted fabric in a washing container of a rotary type washer filled with a washing liquid for 15~30 minutes and then taking it out, dehydrating by inputting into a rotation container of a centrifugal separator and drying in a rotation container of a circulation type hot air drying machine, it is possible to manufacture a natural fiber stripe-quilted fabric having a food touch feeling and an excellent heat insulation effect and an excellent ventilation effect with the help of a lot of protruded wrinkle patterns formed along a sewed line in its front and back surfaces. The present invention can be used to manufacture bedclothes such as a blanket or a pillow as well as a heat insulation clothes.

BACKGROUND ART

A conventional quilted fabric is formed of polyester fabric in its front and back surfaces, not of a pure natural fabric. An intermediate material is formed of polyester cotton or a sponge material, not of a pure natural fabric. Such materials are stacked and quilted in horizontal and vertical directions or quilted in a stripe pattern for thereby manufacturing a quilted fabric. The thusly manufactured fabric is used as a material of clothes or is used for manufacturing a blanket or a pillow. However since the front and back surfaces are made of a synthetic fiber, it is impossible to obtain a good touch feeling or a heat insulation effect like a pure natural fiber. Since it is impossible to sew with a sewing interval of 5~10 mm, a quilting work is performed in a flower shape or a certain pattern shape. So, it is basically impossible to form a protruded wrinkle pattern about a sewing line which has an excellent ventilation effect.

DISCLOSURE OF THE INVENTION

Accordingly, it is an object of the present invention to provide a method for manufacturing a natural fiber stripe-quilted fabric having protruded wrinkle patterns on its surface in which a heat insulation material is inputted between front and back surface sheets, and the fabric is sewed with an interval of 5~10 mm for thereby forming a protruded wrinkle pattern along a sewed line.

To achieve the above objects, a cotton fabric sheet made by using a 30S~60S cotton fiber is prepared for making a front surface sheet and a back surface sheet, and a cotton plate with a certain thickness is made by needle-punching a raw cotton and is used as an intermediate material. A cotton plate is disposed between the front and back surface sheets and is inputted into a sewing machine for thereby sewing with a sewing interval of 5~10 mm for thereby manufacturing a stripe-quilted fabric. The thusly made fabric is inputted into a rotary type washing machine filled with a washing liquid for thereby performing a contraction and smoothing process. The fabric is inputted into a centrifugal separator for dehydration, and the dehydrated fabric is inputted into a circulation type hot air drier and dried for 60~90 minutes at 70~90° C. As a result, a protruded wrinkle pattern is naturally formed along a sewing direction and a sewing line of a stripe-quilted fabric for thereby manufacturing a protruded wrinkle pattern fabric which has a smooth touch feeling as well as an excellent heat insulation effect and an excellent water absorption effect and an excellent air ventilation effect.

Effects

In the present invention, natural fiber cotton fabric sheets 1 and 2 made by using a 30S-60S cotton fiber are disposed in front and back surfaces. A cotton plate 3 made by needle-punching a raw cotton win a size of 2~5 mm thick and a weight of 190 g/m² is disposed between the front and back surfaces for thereby manufacturing a quilted fabric with a certain thickness. When quilting while inputting a cotton plate between the cotton fiber fabrics, a motored sewing machine is installed in a support member disposed in a diagonal direction at 70~85° with respect to a running direction of a fabric, and a sewing needle is disposed at an interval of 3~4 cm, so it is possible to install more sewing machines. A support frame with a sewing machine is installed in a diagonal direction at 70~85°, and a stripe-quilted fabric with a sewing line interval is 5~10 mm is inputted into a washing cylindrical container of a rotary type washing machine filled with a washing liquid, and the washing container is rotated in forward and back directions for 15~30 minutes, so that the cotton fiber fabric sheet and cotton plate are soaked with water and are contracted, whereby the fiber is smoothened. Since the cotton plate is more contracted than the cotton fiber fabric sheet disposed in the front and back surfaces. The sewing direction and sewing line intervals of the cotton fiber fabric sheet is swollen by means of a contraction difference for thereby naturally forming protruded wrinkle patterns 1a and 2a. The above protruded wrinkle patterns remain after drying.

So, a user can feel a unique surface touch feeling and an excellent smooth and flexible feeling like natural cotton with the help of a protruded wrinkle pattern formed in its surface. An excellent heat insulation effect as well as a water absorption function can be obtained like natural fibers. Air ventilation is good along a sewing line, and air communication works well via protruded wrinkle patterns formed at both sides of a sewing line for thereby manufacturing a stripe-quilted fabric having an excellent air ventilation effect. The present invention can be well applied to bedclothes such as a blanket and a pillow cover or heat insulation clothes. Since a natural fiber is used, it is very good at health.

In addition, since a raw material formed of a cotton fiber fabric sheet and a cotton plate is made in a form of a stripe-quilted fabric, and the fabric is inputted into washing liquid for contraction. Further contraction or transformation does not occur in the course of washing, so it is possible to obtain a stable stripe-quilted fabric which is not contracted even in water washing. No contraction occurs in the course of water washing. Since the fabric is dried via a drying process, not via a hot air process, fabrics are not damaged in the process. In the present invention, a stable and reliable product can be manufactured.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

Figure 1:
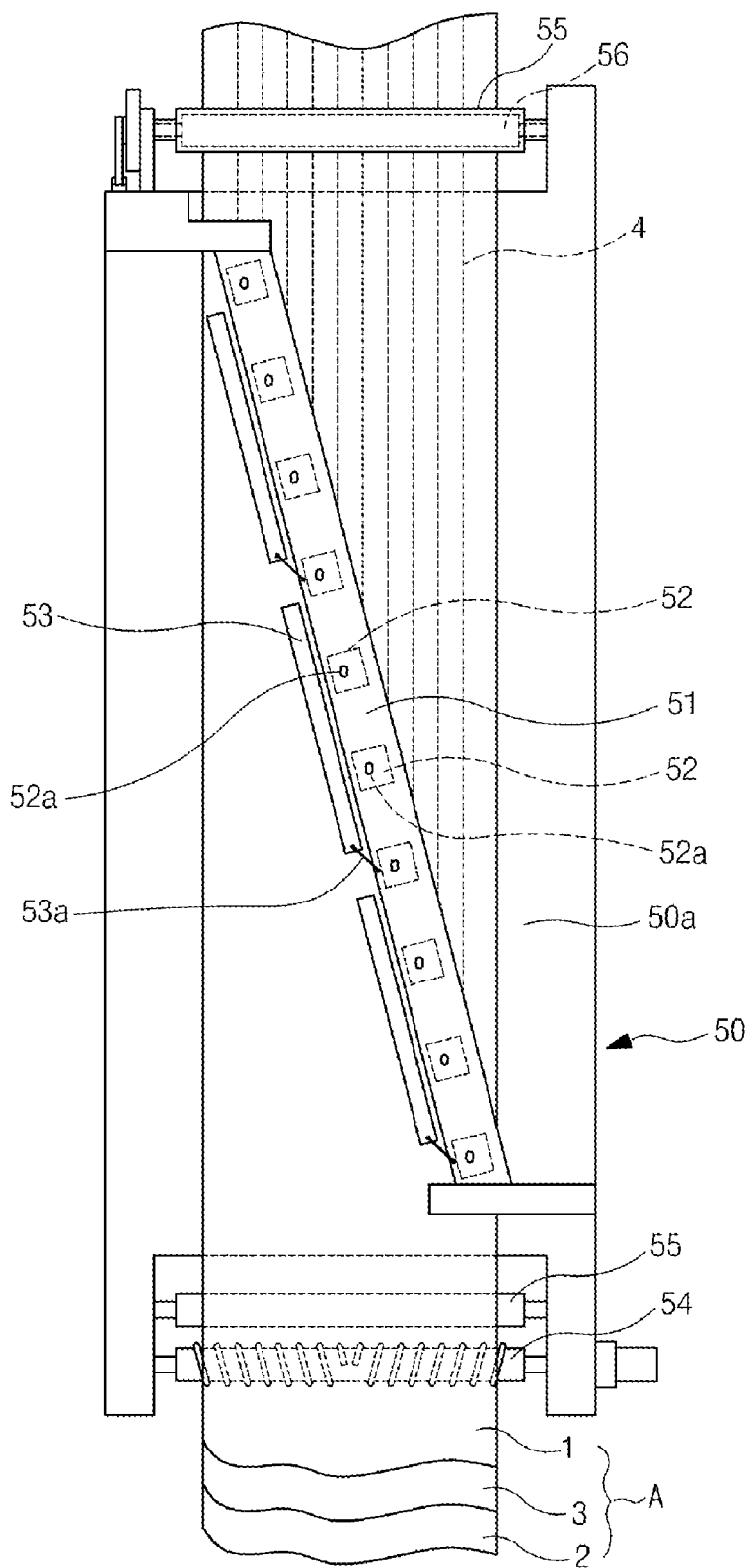
FIG. 1 is a plane view illustrating a quilting machine according to the present invention.
Figure 2:
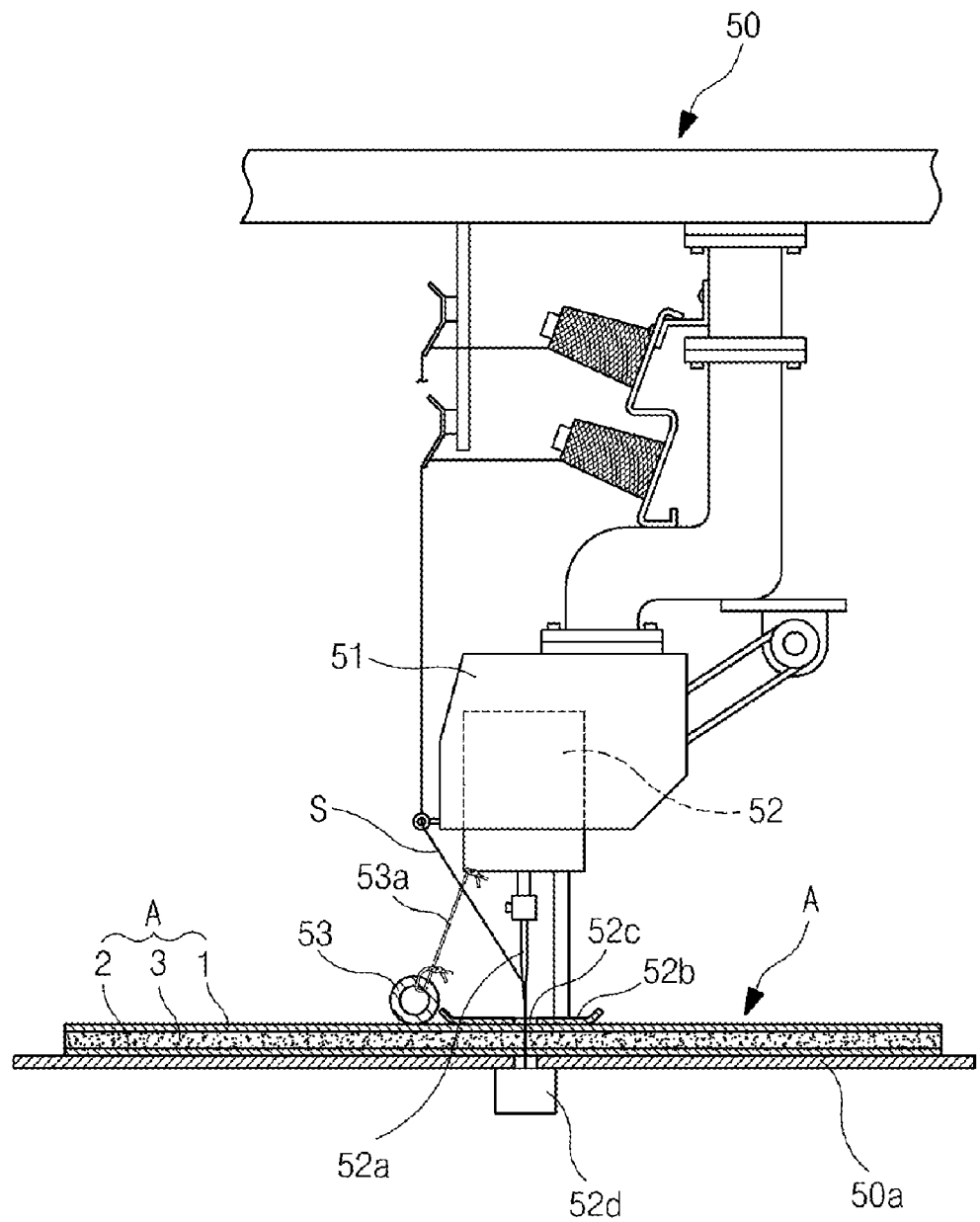
FIG. 2 is an enlarge view illustrating part of a side of a quilting machine according to the present invention.
Figure 3:
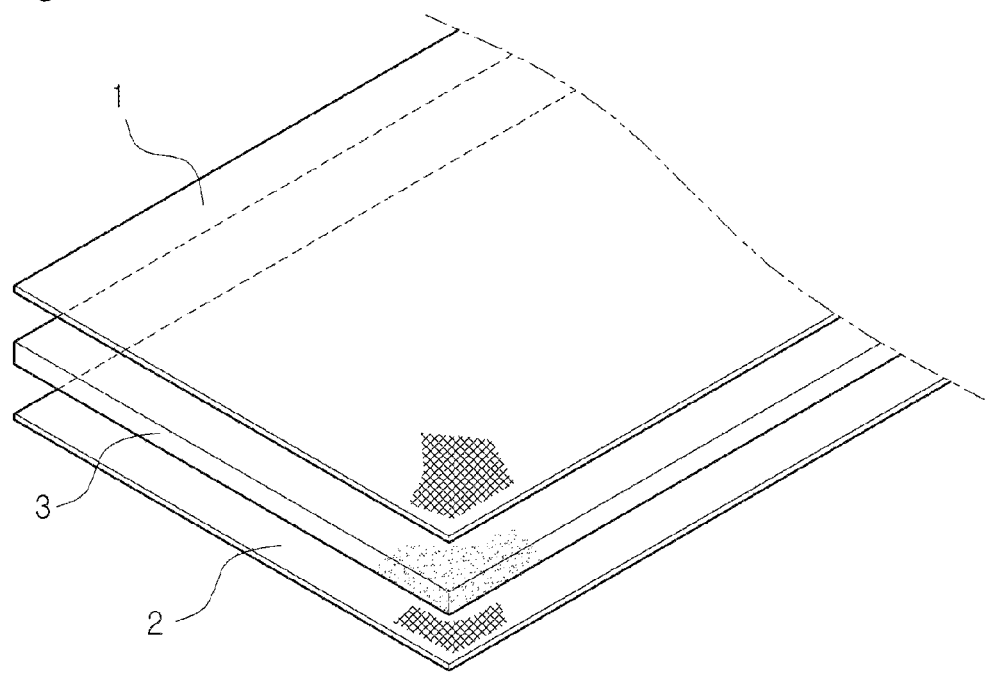
FIG. 3 is a perspective view illustrating a stacked state of a cotton fabric and a cotton plate according to the present invention.
Figure 4:
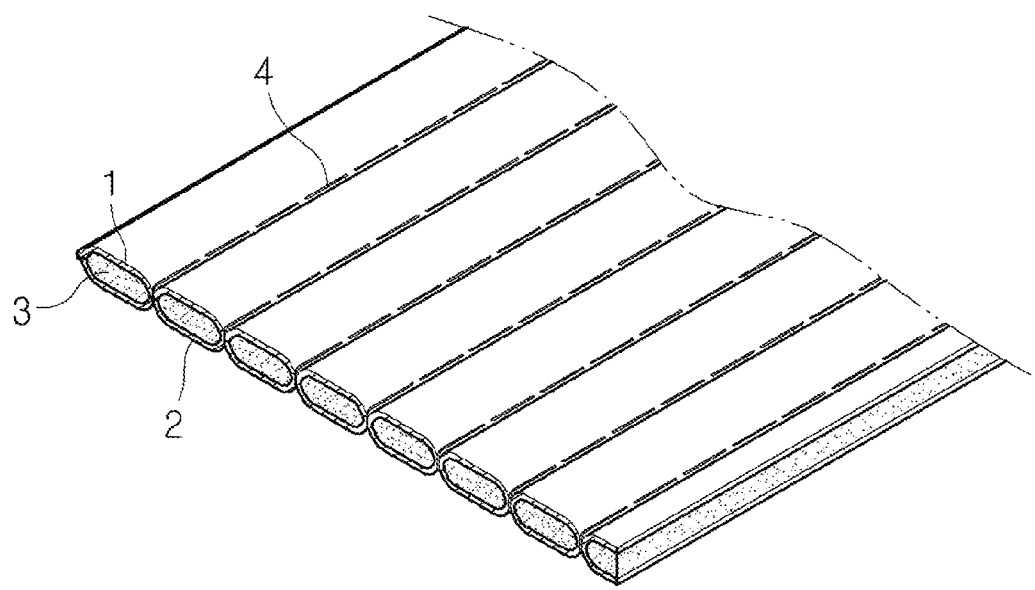
FIG. 4 is a perspective view illustrating an outer construction of a stripe-quilted fabric according to the present invention.
Figure 5:
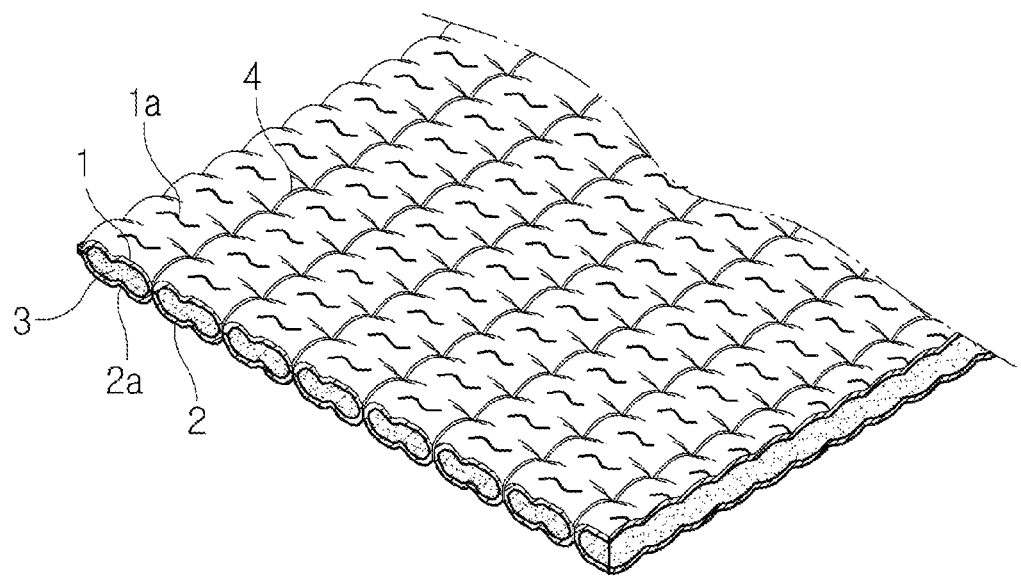
FIG. 5 is a perspective view illustrating an outer construction of a stripe-quilted fabric with a protruded wrinkle pattern made by a method according to the present invention.
Figure 6:
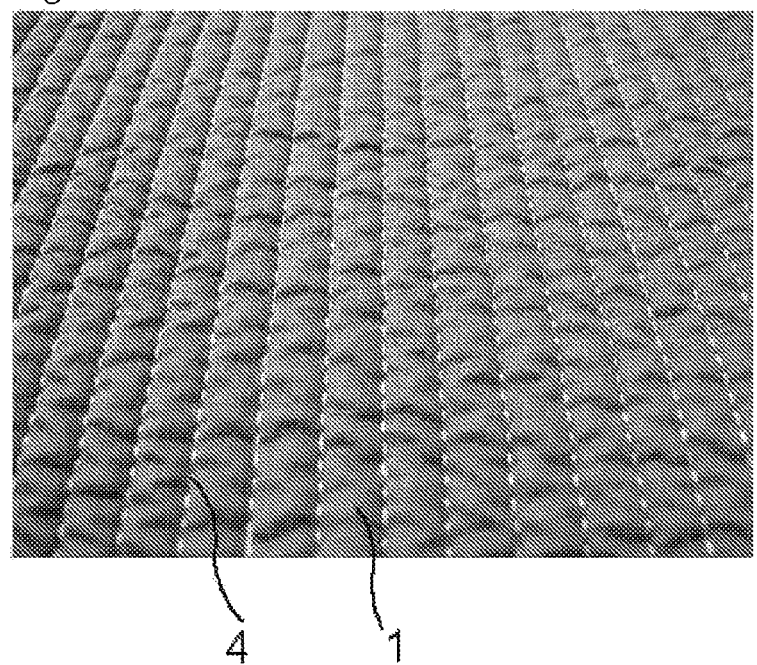
FIG. 6 is a photo of FIG. 3.
Figure 7:
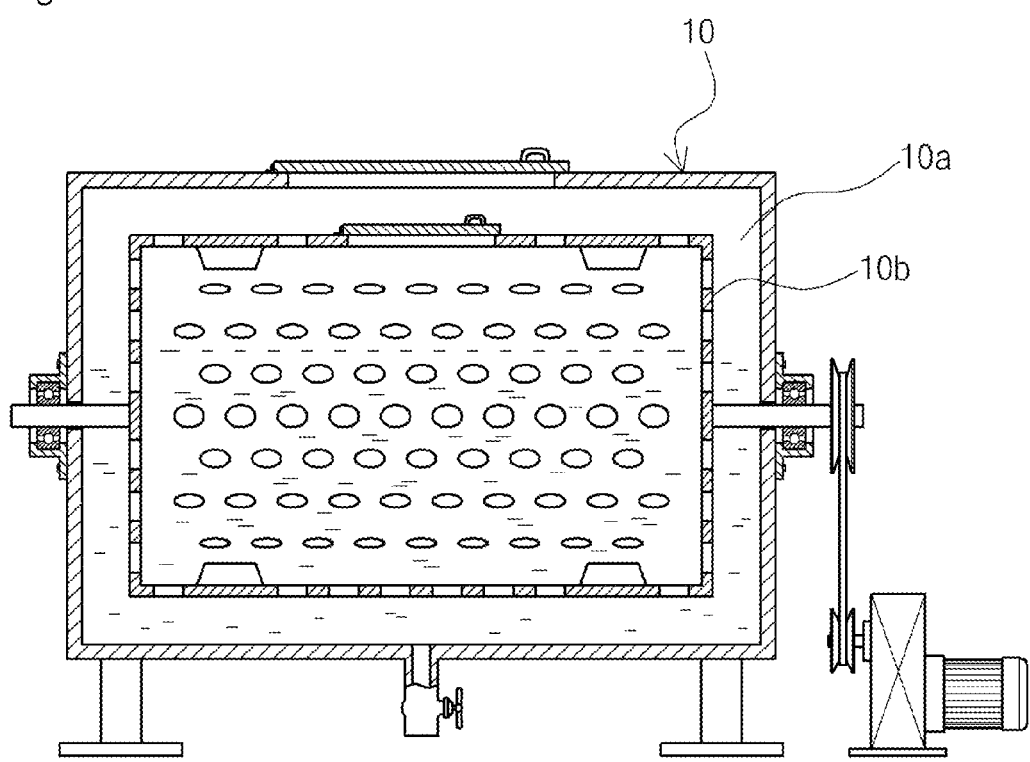
FIG. 7 is an example view illustrating a rotary type washing machine according to the present invention.
Figure 8:
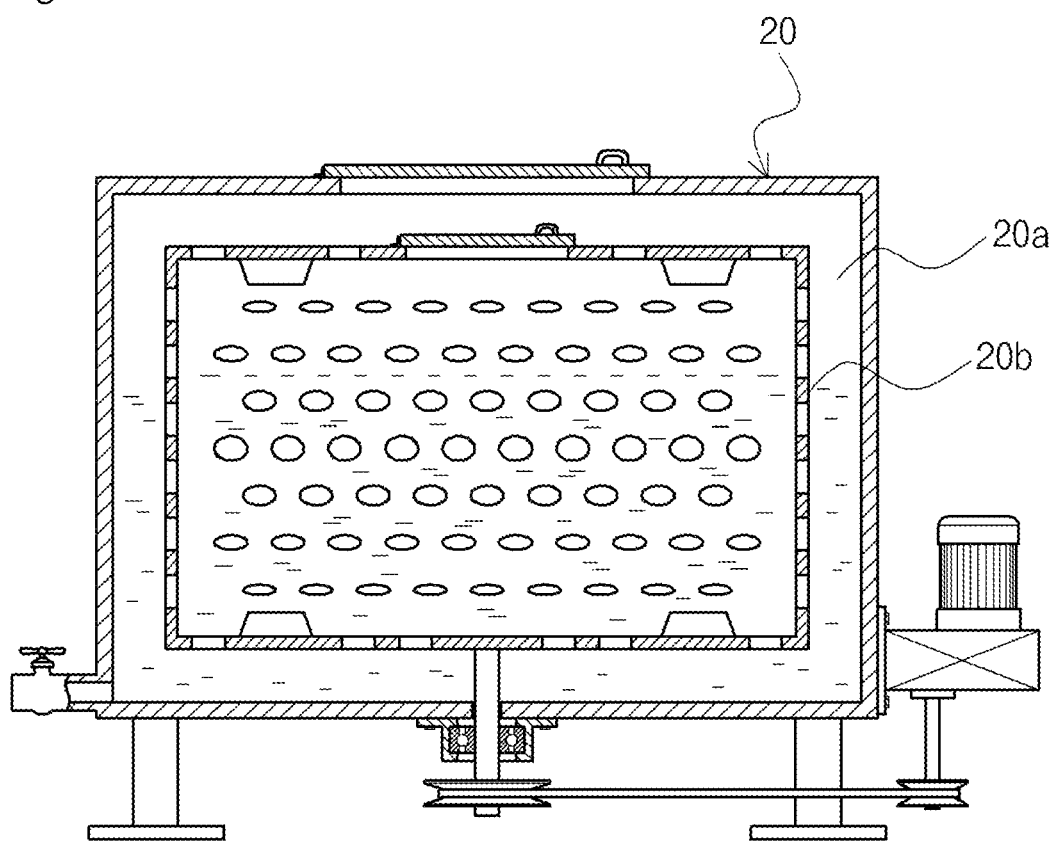
FIG. 8 is an example view illustrating a centrifugal separator according to the present invention.
Figure 9:
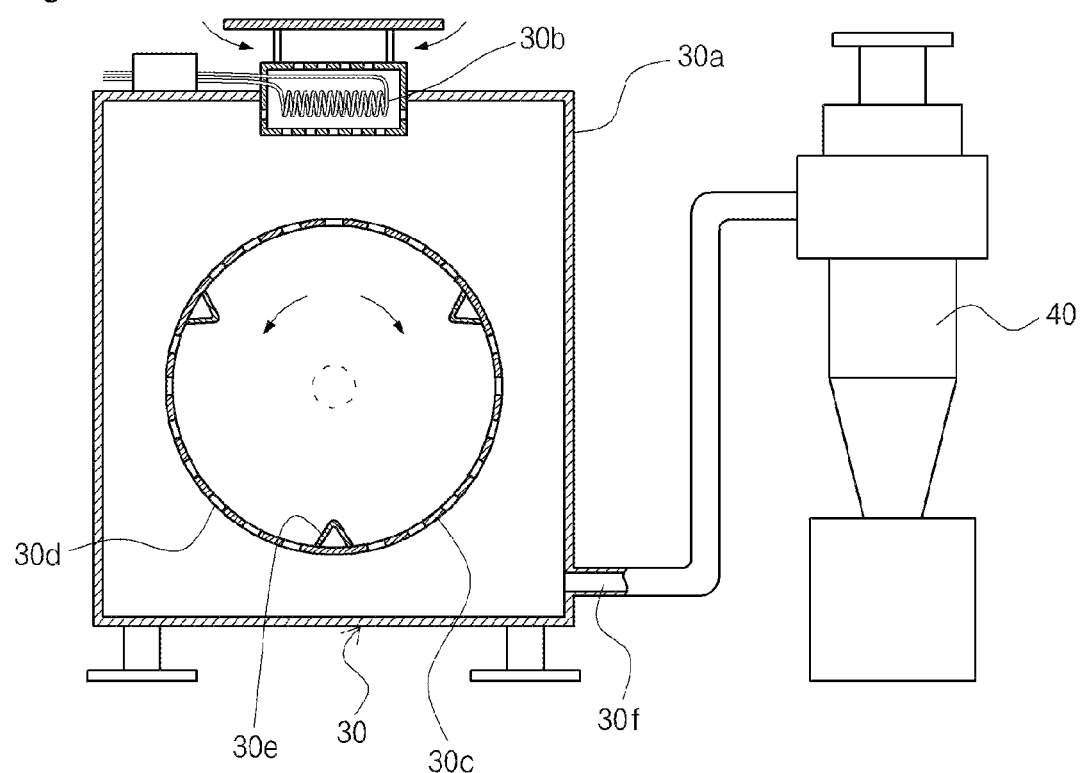
FIG. 9 is an example view illustrating a circulation type hot air drier according to the present invention.

The preferred embodiment of the present invention will be described with reference to the accompanying drawings.

In a method for manufacturing a natural fiber stripe-quilted fabric having protruded wrinkle patterns on its surface which includes a quilted raw fabric(A) preparation step in which cotton fabric sheets 1 and 2 made of one selected from a twill woven fabric and a plain woven fabric by using a 30S-60S cotton fiber is prepared as a front surface sheet and a back surface sheet, and a cotton plate 3 made by needle-punching a raw cotton in a size of 2~5 mm thick and a weight of 190~210 g/m$^2$ is prepared as an intermediate material, and a cotton plate 3 is disposed between the cotton fabric sheets 1 and 2; a stripe-quilted fabric manufacture step in which a cotton plate 3 is inputted into a quilting machine while inputting a cotton plate 3 into between the cotton fabric sheets 1 and 2 and the fabric is sewed with an interval of a sewing line 4 being 5~10 mm; a step in which the stripe-quilted fabric is inputted into a washing container of a rotary type washing machine 10 filled with a washing liquid, and the washing container is repeatedly rotated forwards and backwards for 15~30 minutes for thereby performing a contraction and smoothening process; a dehydration process step in which the contracted and smoothened stripe-quilted fabric is taken out and is inputted into a centrifugal separator 20 for thereby performing a dehydration process; and a dehydration step in which the dehydrated stripe-quilted fabric is inputted into a rotation container of a circulation type hot air heater 40, and the rotation container is rotated for thereby performing a drying process for 60~90 minutes under a hot air environment of 70~90° C., which steps are sequentially performed for thereby manufacturing protruded wrinkle patterns 1a and 2a protruded and wrinkled in a sewing direction and a sewing line of a front surface sheet and a back surface sheet of the fabric, there is provided a method for manufacturing a natural fiber stripe-quilted fabric having protruded wrinkle patterns on its surface characterized in that a quilting machine is installed by fixing a sewing machine support member in a diagonal direction at 70~85° with respect to a running direction of a quilted fabric on an upper plate 50a, and a motor-driven sewing machine is installed in a support structure at a constant interval, and a sewing machine needle 52a is downwardly disposed at an interval of 3~4 cm, and a sewing guide plate 52b is installed along with a certain space between a lower side of the support member 51 and an upper plate of a quilting machine for allowing a quilting fabric A to pass through, and a guide hole 52c is formed so that a sewing machine needle can pass from an upper side to a lower side, and a under thread supply apparatus 52d is installed in a lower side, and a sewing fiber S is supplied while a sewing machine needle moves up and down through a guide hole for thereby sewing a quilting fabric, and a pressing member 53 is disposed in an inner surface of a sewing guide plate in a pipe shape, with the pressing member be installed like being suspended in a support frame with a stripe 53a in an end of a fabric input part, so that a fabric A can move stably, and a fabric unrolling roller 54 and a guide roller 55 are installed in an input part of the upper plate of the quilting machine, and a quilting machine 50 with discharging rollers 56 and 57 is installed in a discharging part, and a quilted fabric is moved over an upper plate of the quilting machine, and a sewing is performed with a sewing line interval of 5~10 mm for thereby manufacturing a stripe-quilted fabric.

The rotary type washing machine 10 according to the present invention is equipped with a rotary cylindrical container 10b having a plurality of holes in a washing liquid storing part 10a and is repeatedly rotated in forward and backward directions. The stripe-quilted fabric is inputted into the washing machine 10, and the washing machine is rotated in forward and backward directions with a washing liquid being filled in the rotation container. The fabric is washed and smoothened while the cotton fabric and cotton plate contact with washing liquid. In the above course, the fabric is contracted as much as about 10~20% in its horizontal and vertical directions. The protruded wrinkle patterns are formed along a sewing line of each front and back surface of the stripe-quilted fabric with the help of a contraction difference between the cotton fabric and the cotton plate.

The centrifugal separator 20 is equipped with a rotation cylindrical container 20b with a plurality of water passing holes along an inner wall in the interior of an outer container 20a and is rotated by means of a motored apparatus, and water-soaked stripe-quilted fabric is inputted into the interior of the rotation container in a washing step, and a cover is closed, and the rotation container is rotated. Water contained in the stripe-quilted fabric is separated with the help of the centrifugal force and is discharged through a plurality of holes formed in a wall of the rotation container for thereby effectively dehydrating water from the stripe-quilted fabric.

The circulation type hot air drier 30 is equipped with an electric heater 30b in a ceiling of a chamber 30a formed in a cubic shape for thereby generating hot air of 70~90° C. A rotation container 30c having ventilation holes 30d and protruded wings 30e formed in a cylindrical wall is disposed in the chamber 30a and is driven to rotate. An exhaust pipe 30f is installed from a lower side to back surface of the chamber 30a and is connected with a hot air drier 40. The dehydrated stripe-quilted fabric is inputted into the rotation container 30c, and a cover is closed, and the rotation container is driven to rotate for thereby generating wind by means of which hot air from the electric heater 30b is circulated in the entire portions inside the chamber, so that the water contained in the stripe-quilted fabric is dried via a charging and discharging operation. The fabric can be dried for 60~90 minutes at relatively lower temperature of 70~90° C. With the above operations, it is possible to dry the fabric without causing any damages to the fabric while preventing transformation in the stripe-quilted fabric.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for manufacturing a natural fiber stripe-quilted fabric having protruded wrinkle patterns on its surface, the method comprising:
   a quilted raw fabric (A) preparation step in which cotton fabric sheets (1, 2) made of one selected from a twill woven fabric and a plain woven fabric by using a 30S~60S cotton fiber is prepared as a front surface sheet and a back surface sheet, and a cotton plate (3) made by needle-punching a raw cotton in a size of 2~5 mm thick and a weight of 190~210 g/m² is prepared as an intermediate material, and the cotton plate (3) is disposed between the cotton fabric sheets (1, 2);
   a stripe-quilted fabric manufacture step in which the cotton plate (3) is inputted into a quilting machine while inputting the cotton plate (3) into between the cotton fabric sheets (1, 2) and the fabric is sewed with an interval of a sewing line (4) being 5~10 mm;
   a contraction/smoothening step in which the stripe-quilted fabric is inputted into a washing container of a rotary type washing machine (10) filled with a washing liquid, and the washing container is repeatedly rotated forwards and backwards for 15~30 minutes for thereby performing a contraction and smoothening process;
   a dehydration process step in which the contracted and smoothened stripe-quilted fabric is taken out and is inputted into a centrifugal separator (20) for thereby performing a dehydration process; and
   a dehydration step in which the dehydrated stripe-quilted fabric is inputted into a rotation container of a circulation type hot air heater (40), and the rotation container is rotated for thereby performing a drying process for 60~90 minutes under a hot air environment of 70~90° C.,
   wherein the steps are sequentially performed for thereby manufacturing protruded wrinkle patterns (1a, 2a) protruded and wrinkled in a sewing direction and the sewing line of the front surface sheet and the back surface sheet of the fabric.

2. The method as claimed in claim 1, wherein the quilting machine is installed by fixing a sewing machine support member in a diagonal direction at 70~85° with respect to a running direction of a quilted fabric on an upper plate (50a), and a motor-driven sewing machine is installed in a support structure at a constant interval, and a sewing machine needle (52a) is downwardly disposed at an interval of 3~4 cm, and a sewing guide plate (52b) is installed along with a certain space between a lower side of the support member (51) and an upper plate of the quilting machine for allowing the quilting fabric (A) to pass through, and a guide hole (52c) is formed so that the sewing machine needle can pass from an upper side to a lower side, and a under thread supply apparatus (52d) is installed in a lower side, and a sewing fiber S is supplied while the sewing machine needle (52a) moves up and down through a guide hole for thereby sewing a quilting fabric, and a pressing member (53) is disposed in an inner surface of a sewing guide plate in a pipe shape, with the pressing member be installed like being suspended in a support frame with a stripe (53a) in an end of a fabric input part, so that the fabric (A) can move stably, and a fabric unrolling roller (54) and a guide roller (55) are installed in an input part of the upper plate of the quilting machine, and the quilting machine (50) with discharging rollers (56, 57) is installed in a discharging part, and a quilted fabric is moved over an upper plate of the quilting machine, and a sewing is performed with a sewing line interval of 5~10 mm for thereby manufacturing the stripe-quilted fabric.

3. A method for manufacturing a natural fiber stripe-quilted fabric having protruded wrinkle patterns on its surface, the method comprising:
   a quilted raw fabric preparation step in which cotton fabric sheets is prepared as a front surface sheet and a back surface sheet, and a cotton plate is prepared as an intermediate material, and the cotton plate is disposed between the cotton fabric sheets;
   a stripe-quilted fabric manufacture step in which the cotton plate is inputted into a quilting machine while inputting the cotton plate into between the cotton fabric sheets and the fabric is sewed with a preset interval of a sewing line;
   a contraction/smoothening step in which the stripe-quilted fabric is inputted into a washing container of a washing machine filled with a washing liquid, and the washing container is repeatedly rotated forwards and backwards for a preset time for thereby performing a contraction and smoothening process;
   a dehydration process step in which the contracted and smoothened stripe-quilted fabric is taken out and is inputted into a centrifugal separator for thereby performing a dehydration process; and
   a drying step in which the dehydrated stripe-quilted fabric is inputted into a rotation container of a circulation type hot air heater, and the rotation container is rotated for thereby performing a drying process.

4. The method as claimed in claim 3, wherein the cotton fabric sheets are made of one selected from a twill woven fabric and a plain woven fabric by using a 30S~60S cotton fiber.

5. The method as claimed in claim 3, wherein the cotton plate is made by needle-punching a raw cotton in a thickness in a range of 2~5 mm and a weight in a range of 190~210 g/m².

6. The method as claimed in claim 3, wherein the preset interval is in a range of 5~10 mm.

7. The method as claimed in claim 3, wherein the washing machine is a rotary type washing machine, and the preset time is in a range of 15~30 minutes.

8. The method as claimed in claim 3, wherein the drying process is performed for 60~90 minutes under temperature in a range of 70~90° C.

9. The method as claimed in claim 3, wherein the steps are sequentially performed for thereby manufacturing protruded wrinkle patterns protruded and wrinkled in a sewing direction and the sewing line of the front surface sheet and the back surface sheet of the fabric.

10. The method as claimed in claim 3, wherein the quilting machine is installed by fixing a sewing machine support member in a diagonal direction with respect to a running direction of a quilted fabric on an upper plate, and a motor-driven sewing machine is installed in a support structure at a constant interval, and a sewing machine needle is downwardly disposed at a predetermined interval, and a sewing guide plate is installed along with a certain space between a lower side of the support member and an upper plate of the quilting machine for allowing the quilting fabric to pass through, and a guide hole is formed so that the sewing machine needle can pass from an upper side to a lower side, and a under thread supply apparatus is installed in a lower side, and a sewing fiber S is supplied while the sewing machine needle moves up and down through a guide hole for thereby sewing a quilting fabric, and a pressing member is disposed in an inner surface of a sewing guide plate in a pipe shape, with the pressing member be installed like being suspended in a support frame with a stripe in an end of a fabric input part, so that the fabric can move stably, and a fabric unrolling roller and a guide roller are installed in an input part of the upper plate of the quilting machine, and the quilting machine with discharging rollers is installed in a discharging part, and a quilted fabric is moved over an upper plate of the quilting machine, and a sewing is performed with a preset sewing line interval for thereby manufacturing the stripe-quilted fabric.

11. The method as claimed in claim 10, wherein the sewing machine support member is fixed in a diagonal direction at an angle in a range of 70~85° with respect to a running direction of the quilted fabric on the upper plate.

12. The method as claimed in claim 10, wherein the predetermined interval is in a range of 3~4 cm.

13. The method as claimed in claim 10, wherein the preset sewing line interval is in a range of 5~10 nm.

* * * * *